United States Patent
Hutton

(10) Patent No.: US 9,227,861 B2
(45) Date of Patent: Jan. 5, 2016

(54) AIR CLOUD PARTICLE SUSPENSION DREDGE

(71) Applicant: John Hutton, Tybee Island, GA (US)

(72) Inventor: John Hutton, Tybee Island, GA (US)

(*) Notice: Subject to any disclaimer, the term of this patent is extended or adjusted under 35 U.S.C. 154(b) by 50 days.

(21) Appl. No.: 13/887,653

(22) Filed: May 6, 2013

(65) Prior Publication Data

US 2014/0326679 A1  Nov. 6, 2014

(51) Int. Cl.
*C02F 1/74* (2006.01)
*E02F 3/92* (2006.01)
*E02F 5/00* (2006.01)

(52) U.S. Cl.
CPC .............. *C02F 1/74* (2013.01); *E02F 3/9206* (2013.01); *E02F 5/006* (2013.01)

(58) Field of Classification Search
CPC ............ E02F 5/107; E02F 5/287; C02F 1/74; C02F 7/00; E02B 3/023
USPC .................. 37/307, 344; 261/76, 121.1, 124; 210/706; 405/163; 406/89–91, 406/136–138
See application file for complete search history.

(56) References Cited

U.S. PATENT DOCUMENTS

| | | | | |
|---|---|---|---|---|
| 301,682 A * | 7/1884 | Coiseau | ................ | E02F 5/287 37/344 |
| 449,479 A * | 3/1891 | Holden | ................ | E02F 5/287 114/55 |
| 510,713 A * | 12/1893 | Scott | ................ | E02F 5/287 37/344 |
| 585,116 A * | 6/1897 | Nichols | ................ | E02F 5/287 37/344 |
| 1,777,491 A * | 10/1930 | Harp | ................ | E02B 3/023 37/195 |
| 3,109,288 A * | 11/1963 | Gross | ................ | 405/61 |
| 3,234,123 A * | 2/1966 | Hinde | ................ | 210/602 |
| 3,293,861 A * | 12/1966 | Hinde | ................ | A01K 63/042 138/118 |
| 3,470,091 A * | 9/1969 | Budd | ................ | C02F 3/02 210/170.05 |
| 3,505,213 A * | 4/1970 | Fulton et al. | ................ | 210/614 |
| 3,645,892 A * | 2/1972 | Schulman | ................ | 210/706 |
| 3,651,646 A * | 3/1972 | Grunau | ................ | B01F 3/04255 210/170.11 |
| 3,683,627 A * | 8/1972 | Girden | ................ | 405/52 |
| 3,885,331 A * | 5/1975 | Mathieu | ................ | E02F 9/062 114/151 |
| 3,956,124 A * | 5/1976 | Fast | ................ | A01K 63/042 210/170.06 |
| 4,147,450 A * | 4/1979 | Schoonmaker | ................ | E02F 3/8808 37/322 |
| 4,522,151 A * | 6/1985 | Arbisi et al. | ................ | 261/76 |
| 4,600,338 A * | 7/1986 | Van Bruwaene et al. | ................ | 37/195 |
| 4,604,000 A * | 8/1986 | van Weezenbeek | ................ | E02F 5/287 37/344 |
| 4,819,347 A * | 4/1989 | Lofgren | ................ | E02F 5/287 37/195 |
| 5,013,493 A * | 5/1991 | Tharp | ................ | 261/122.2 |
| 5,616,288 A * | 4/1997 | McDonald | ................ | 261/76 |
| 6,676,837 B2 * | 1/2004 | Keeton, Jr. | ................ | B01F 3/04113 210/170.02 |

(Continued)

*Primary Examiner* — Matthew D Troutman
(74) *Attorney, Agent, or Firm* — MU Patents; Timothy Marc Shropshire

(57) ABSTRACT

A dredging system agitates the bottom sediment of a waterway to remove particles and oxygenate the water. The system diffuses air through a grid mounted on a waterway floor, raising particle clouds. The particle clouds are transported downstream by water currents while releasing dissolved oxygen throughout the water column. The method of particle removal and oxygenation is used in shallow depths, less than thirty-three feet (2 bars) with minimum favorable water currents of one-half to one knot. The grid is used for diffusion of air to alleviate hypoxic environments in depths less than sixty-six feet (5 bars).

11 Claims, 2 Drawing Sheets

(56) References Cited

U.S. PATENT DOCUMENTS

| | | | |
|---|---|---|---|
| 6,787,045 B1 * | 9/2004 | O'Hara | 210/739 |
| 6,929,746 B2 * | 8/2005 | Keeton, Jr. | A01C 3/023 |
| | | | 210/620 |
| 7,255,332 B2 * | 8/2007 | Osborn | B01F 3/0473 |
| | | | 210/221.2 |
| 8,128,070 B1 * | 3/2012 | Allan et al. | 261/36.1 |
| 8,132,794 B2 * | 3/2012 | Hinde | 261/105 |
| 8,297,881 B2 * | 10/2012 | Spani | 405/80 |
| 2007/0267334 A1 * | 11/2007 | Osborn | B01F 3/0473 |
| | | | 210/97 |
| 2013/0140242 A1 * | 6/2013 | Gomes De Oliveira | C02F 1/24 |
| | | | 210/704 |

* cited by examiner

AIR CLOUD PARTICLE SUSPENSION DREDGE

CROSS-REFERENCE TO RELATED APPLICATIONS

Not Applicable

STATEMENT REGARDING FEDERALLY SPONSORED RESEARCH OR DEVELOPMENT

Not Applicable

REFERENCES CITED

The following are examples of prior art that were found to be relevant to this invention.

The USPTO parent classification 37 was found to be the most relevant to the invention. The patents are listed below in approximate order of importance.

The core of the invention appears to be a system that agitates the bottom sediment of a waterway using compressed air pumped through a grid placed on the bottom of the waterway, causing the particles of sediment to be suspended in the water column where they can be carried away by favorable currents.

U.S. Patent Documents

| | | |
|---|---|---|
| 8,083,437 | December 2011 | Antill, Sr. |
| 4,600,338 | July 1986 | VanBruaene et al. |
| 6,125,560 | October 2000 | Taplin |
| 7,526,884 | May 2009 | Langejan |
| 4,307,525 | December 1981 | Beaumont |
| 5,970,635 | October 1999 | Wilmoth |
| 5,659,983 | August 1977 | Coutarel et al. |
| 4,889,391 | December 1989 | Cornelius |

Dak Steiert, Intelligent Patent Services, Palo Alto, Calif.

DESCRIPTION

Background of the Invention

The present invention is in the technical field of dredging. More particularly, the present invention is in the technical field of air-suspended particle removal by a sea floor-mounted grid.

Conventional air-suspended particle removal dredges, such as air-lift suction dredges, cutter-suction dredges with air injection, jet-lift dredges and air-lift dredges remove large quantities of material by creating a slurry and pumping the slurry into a hopper or onto a spoil area. The difficulties of these devices are their size and in their initial and operating expenses. The size and complexity of dredging machinery makes these methods of dredging out of reach of the general public. The expense of operating these dredges is beyond the reach of individuals and small businesses.

A second method of particle suspension, the water injection or agitation dredge, creates a particle slurry with water jets and allows currents to carry the slurry to another area. This dredging method is effective only so long as the induced particle slurry remains suspended in the water. Therefore, large amounts of water must be used to suspend the slurry, causing visual and ecological problems.

SUMMARY OF THE INVENTION

The sea floor-mounted air cloud dredge has a surface power source and instrumentation with a power connector running to an air compressor, storage tank and instrumentation, with a compressed air distribution line on which is installed air valves and gauges and an additive injection port. A tether line and current sensor conduit are fastened to the air distribution line which enters the water and runs to the air grid injection port entering the sea floor-mounted air grid. Attached to the air grid is a water current sensor and outrigger ballast struts. On the underside of the sea floor-mounted air grid are air nozzles for delivering compressed air to the target area.

The power source is a diesel engine or electric motor with sufficient power to operate the air compressor, producing a minimum 150 psig through a minimum 30 gallon storage tank according to signals from the current sensor. The air distribution line is of varying pipe size and length sufficient to deliver the required air from the air compressor through the valves and gauges installed on the air distribution line. The valves and gauges are sufficient to halt air flow, prevent backflow, and deliver air as measured psi. The additive injection port enables the addition of polymers and other additives to enhance air distribution efficiency. The tether line and current sensor conduit are attached to the air distribution line which enters the water and attaches to the air injection port allowing pressurized flow through the sea floor-mounted air grid. Air flow through the air grid commences when the current sensor signals the air compressor that minimum current speed is available. Fastened to the sea floor-mounted air grid are outrigger and ballast struts to offset flotation and to prevent grid burial. The air nozzles attached to the air grid are of sufficient size to deliver the compressed air a minimum of 6 inches below the nozzle openings. The nozzles are typically spaced 6 to 12 inches apart on the undersides of the sections of the air grid.

DESCRIPTION OF THE PREFERRED EMBODIMENT

Figure 1:
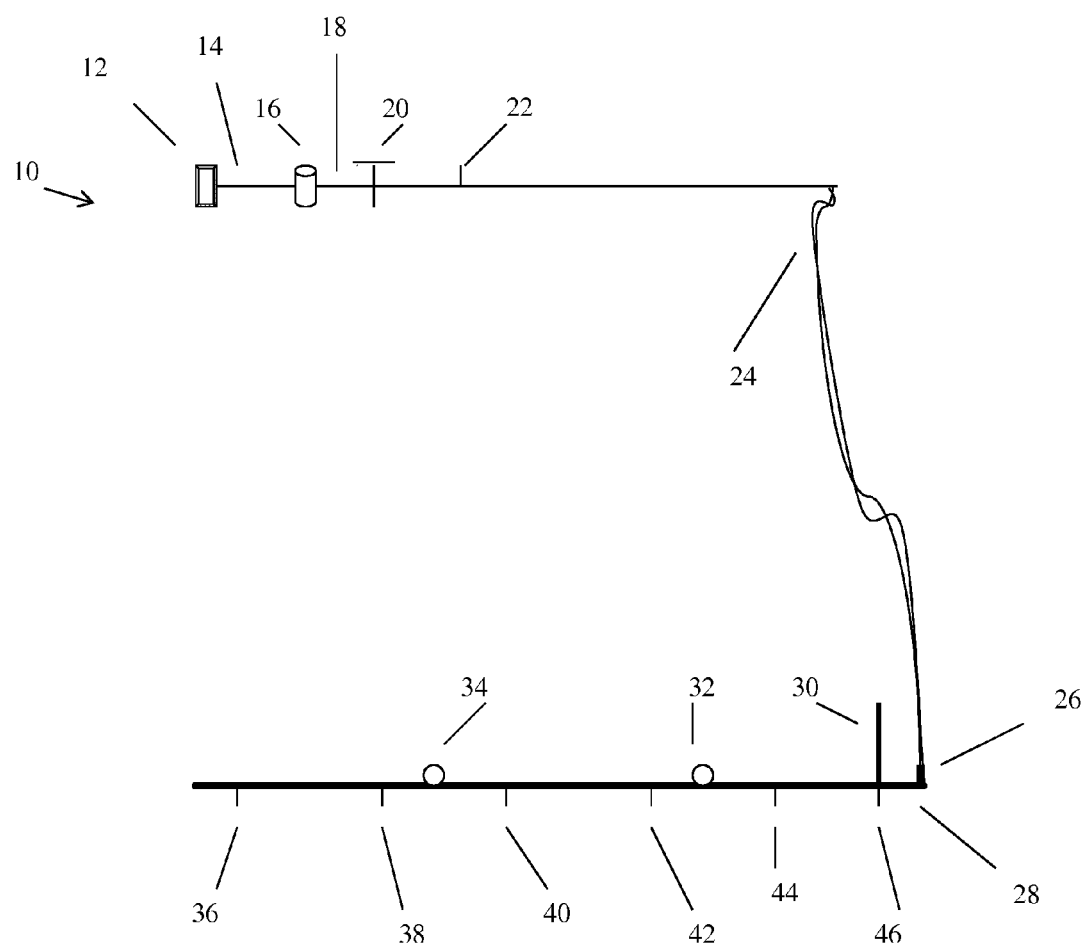
FIG. 1 is a side view of an air cloud dredge of the present invention.

Referring now to the invention in more detail, in FIG. 1 there is shown a sea floor-mounted air cloud dredge 10 having a surface power source and instrumentation 12 with a power connector 14 running to an air compressor, storage tank and instrumentation 16 with a compressed air distribution line 18 on which is installed air valve's and gauges 20 and an additive injection port 22. A tether line and current sensor conduit 24 are fastened to the air distribution line 18 which enters the water and runs to the air grid injection port 26 entering the sea floor-mounted air grid 28. Attached to the air grid 28 is a water current sensor 30 and outrigger ballast struts 32 and 34. On the underside of the air grid 28 are air nozzles 36, 38, 40, 42, 44, and 46.

In further detail, still referring to the invention as shown in FIG. 1, the power source 12 is a diesel engine or electric motor with sufficient power to operate the air compressor 16, producing a minimum 150 psig through a 30 gallon storage tank according to signals from the current sensor 30. The air distribution line 18 is of varying pipe size and length sufficient to deliver the required air from the air compressor 16 through the valves and gauges 20 installed on the air distribution line 18. The valves and gauges 20 are sufficient to halt air flow, prevent backflow, and deliver air as measured psi. The additive injection port 22 enables the addition of polymers and other additives to enhance air distribution efficiency.

In further detail, still referring to the invention as shown in FIG. 1, the tether line and current sensor conduit 24 are attached to the air distribution line 18 which enters the water and attaches to the air injection port 26 allowing pressurized flow through the sea floor-mounted air grid 28. Air flow through the air grid commences when the current sensor 30 signals the air compressor 16 that minimum current speed is available.

In further detail, still referring to the invention as shown in FIG. 1, fastened to the sea floor-mounted air grid 28 are outrigger and ballast struts 32 and 34 to offset flotation and to prevent grid burial. The air nozzles 36, 38, 40, 42, 44, and 46 attached to the air grid 28 are of sufficient size to deliver the compressed air a minimum of 6 inches below the nozzle openings. The nozzles 36, 38, 40, 42, 44, and 46 are typically spaced 6 to 12 inches apart on the undersides of the sections of the air grid 28.

The construction materials of the invention as shown in FIG. 1 are that the sea floor-mounted air cloud dredge 10 may be made of various materials supplied by various manufacturers. The sections of the air grid 28 may be made of metal, HDPE, PVC, CPVC and other materials with a minimum 200 psi rating. The air distribution line 18 may be rigid and/or flexible with a minimum 250 psi rating. All other components of the sea floor-mounted air cloud dredge 10 exist as manufactured items and may be purchased according to the minimum requirements for the specific operation of the air cloud dredge 10. Further, various components may be deleted from or added to the air cloud dredge 10 for specific operations. The additive injection port 22 may be deleted and the current sensor 28 may be substituted for a surface-mounted timer.

Figure 2:
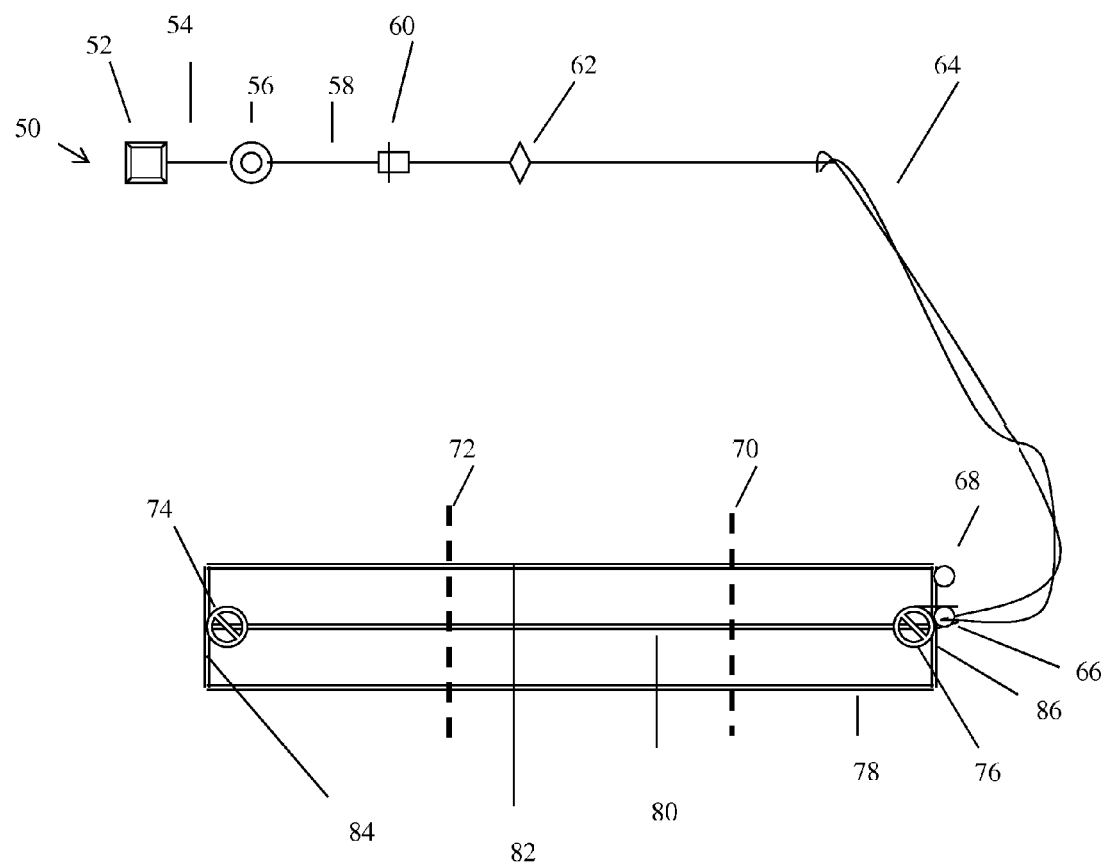
FIG. 2 is a top view of an air cloud dredge of the present invention

Referring now to FIG. 2, there is shown a sea floor-mounted air cloud dredge 50 having a surface power source and instrumentation 52 with a power connector 54 running to a surface air compressor, storage tank and instrumentation 56 with a compressed air distribution line 58 on which is installed air valves and gauges 60 and an additive injection port 62. A tether line and current sensor conduit 64 are fastened to the air distribution line 58 which enters the water and runs to the air grid injection port 66 on the sea floor-mounted air grid section 86. Attached to the air grid section 86 is a water current sensor 68.

In further detail, still referring to FIG. 2, outrigger and ballast struts 70 and 72 are fastened to sections 78, 80, and 82 of the sea floor-mounted air grid. Lifting devices 74 and 76 are fastened to the intersections of sections 80, 84, and 86 and are spaced every 10 to 20 feet along the sea floor-mounted unit according to its size and weight.

The construction materials of the invention as shown in FIG. 2 of the air cloud dredge 50 may be made of various materials supplied by various manufacturers. The sections 78, 80, 82, 84, and 86 of the sea floor-mounted grid may be made of metal, HDPE, PVC, CPVC and other materials with a minimum 200 psi rating. The air distribution line 58 may be rigid and/or flexible with a minimum 250 psi rating. All other components of the air cloud dredge 50 exist as manufactured items and may be purchased according to the minimum requirements for the specific operation of the air cloud dredge 50. Further, various components may be deleted from or added to the air cloud dredge 50 for specific operations. The additive injection port 62 may be deleted and the current sensor 68 may be substituted for a surface-mounted timer.

The advantages of the present invention include, without limitation, the position of its sea floor-mounted grid, its simplicity of design, its ease of fabrication and operation, and its low impact on the environment. The principles of design of the invention are position on the sea floor, air compression, particle suspension, and transport by natural or induced currents. All of the materials for the present invention may be easily purchased, and fabrication may be successful with a nominal skill set. The low environmental impact of the present invention is effected by its operation according to the availability of natural currents and its use of oxygen to cause particle suspension as well as to supply dissolved oxygen from the base of the water column.

In broad embodiment, the present invention is less impactive, easier to operate, more efficient, and less expensive than the typical dredges using cutter heads, air injection, suction piping, pressure pumping and spoil areas. It is a gentler process than typical dredging, allowing a less harmful impact on the environment. Further, the placement of its sea floor-mounted air grid allows maximum particle suspension as well as dissolved oxygen dispersal upward through the entire water column.

While the forgoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed

I claim:

1. A method of waterway particle removal and aeration, comprising the steps of:
   a. mounting an air grid having a current sensor attached thereto above a waterway floor, wherein the air grid and the current sensor are in communication with an air compressor, wherein the current sensor measures a current speed and initiates air flow from the air compressor through a plurality of air nozzles on an underside of the air grid once a predetermined current speed has been detected; and
   b. injecting pressurized air from the air grid into the waterway floor, wherein as air is injected into the waterway floor, a waterway floor sediment is agitated and suspended into the waterway, and wherein the sediment is transported downstream by a waterway current.

2. The method of claim 1, wherein a vertical profile of the suspended sediment is regulated by measured air feed, bubble size, and pressure.

3. The method of claim 1, further comprising the step of fastening a plurality of outrigger ballast struts to the air grid, wherein the outrigger ballast struts are configured to offset floatation and prevent burial of the air grid.

4. A waterway floor-mounted air cloud dredge system comprising:
   a. a power source;
   b. an air compressor having a storage tank, wherein the air compressor is in communication with the power source;
   c. an air grid mounted above a waterway floor, the air grid comprising:
      i. a plurality of air nozzles on an underside of the air grid configured to direct pressurized air into a waterway floor;
      ii. an air injection port; and
      iii. a current sensor in communication with the air compressor, wherein the current sensor is configured to measure a current speed and initiate air flow through the system once a pre-determined current speed has been detected; and d. an air distribution line, wherein a first end of the air distribution line is configured to connect to the air compressor and a second end of the air distribution line is configured to connect to the air injection port of the air grid.

5. The waterway floor-mounted air cloud dredge system of claim 4, wherein the air grid further comprises a plurality of outrigger ballast struts configured to offset floatation and prevent burial of the air grid.

6. The waterway floor-mounted air cloud dredge system of claim 4, wherein the power source is selected from the group consisting of a diesel engine and an electric motor.

7. The waterway floor-mounted air cloud dredge system of claim 4, wherein the air distribution line comprises:

a. a plurality of air valves and gauges; and b. an additive injection port.

8. A method of using the waterway floor-mounted air cloud dredge system of claim 4, comprising the steps of:

a. pressurizing air with the air compressor;

b. storing the pressurized air in the air compressor's storage tank;

c. measuring the current speed of a waterway with the current sensor;

d. releasing pressurized air from the storage tank into the system once the pre-determined current speed is detected by the current sensor; and e. injecting the pressurized air from the air grid's plurality of air nozzles into the waterway floor, wherein as air is injected into the waterway floor, a waterway floor sediment is agitated and suspended into the waterway, and wherein the sediment is transported downstream by a waterway current.

9. The method claim 8, wherein the power source is selected from the group consisting of a diesel engine and an electric motor.

10. The method claim 8, wherein the air distribution line comprises:

a. a plurality of air valves and gauges; and b. an additive injection port.

11. The method of claim 8, further comprising the step of fastening a plurality of outrigger ballast struts to the air grid, wherein the outrigger ballast struts are configured to offset floatation and prevent burial of the air grid.

* * * * *